(12) United States Patent
Liedtke et al.

(10) Patent No.: US 7,548,857 B2
(45) Date of Patent: Jun. 16, 2009

(54) METHOD FOR NATURAL VOICE RECOGNITION BASED ON A GENERATIVE TRANSFORMATION/PHRASE STRUCTURE GRAMMAR

(75) Inventors: Klaus Dieter Liedtke, Nienburg (DE); Gunthert Markefka, Wolfsburg (DE)

(73) Assignee: Minebea Co., Ltd. (JP)

( * ) Notice: Subject to any disclaimer, the term of this patent is extended or adjusted under 35 U.S.C. 154(b) by 295 days.

(21) Appl. No.: 10/519,653

(22) PCT Filed: Jun. 26, 2003

(86) PCT No.: PCT/DE03/02135

§ 371 (c)(1),
(2), (4) Date: Aug. 26, 2005

(87) PCT Pub. No.: WO2004/003888

PCT Pub. Date: Jan. 8, 2004

(65) Prior Publication Data
US 2006/0161436 A1 Jul. 20, 2006

(30) Foreign Application Priority Data
Jun. 28, 2002 (DE) .............................. 102 29 207

(51) Int. Cl.
*G10L 15/00* (2006.01)

(52) U.S. Cl. .......................... 704/246; 704/9; 704/257; 704/251; 707/3; 707/4

(58) Field of Classification Search ...................... 704/1, 704/9, 200, 231, 246, 251, 257, 275, 270, 704/270.1; 707/3, 4
See application file for complete search history.

(56) References Cited

U.S. PATENT DOCUMENTS

| 6,070,140 | A | * | 5/2000 | Tran | 704/275 |
| 6,633,846 | B1 | * | 10/2003 | Bennett et al. | 704/257 |
| 7,058,567 | B2 | * | 6/2006 | Ait-Mokhtar et al. | 704/9 |
| 7,120,582 | B1 | * | 10/2006 | Young et al. | 704/255 |
| 2002/0026307 | A1 | * | 2/2002 | Ruland | 704/9 |

* cited by examiner

*Primary Examiner*—Daniel D Abebe
(74) *Attorney, Agent, or Firm*—Cooper & Dunham LLP (57) ABSTRACT

The invention relates to a method for natural voice recognition based on a generative transformation/phrase structure grammar known as GT/PS grammar. According to the invention, a spoken phrase is analyzed for triphones contained therein, words contained in the spoken phrase are formed from the recognized triphones with the aid dictionaries and the spoken phrase is syntactically reconstructed from the recognized words using a grammar. The GT/PS grammar is a novel method enabling target sentences to be placed in said grammar. It uses traditional Grammar Specification Language (GSL), structures said sentences however in an innovative manner. It is oriented towards the rules of phrase structure grammar and Noam Chomsky's concept of generative transformation grammar.

5 Claims, 6 Drawing Sheets

METHOD FOR NATURAL VOICE RECOGNITION BASED ON A GENERATIVE TRANSFORMATION/PHRASE STRUCTURE GRAMMAR

The invention relates to a method for natural voice recognition based on a generative transformation/phrase structure grammar (GT/PS grammar).

Current voice recognition systems with natural language understanding (NLU) are capable of understanding many possible utterings and translating them into complex command structures which cause voice recognition systems, e.g. computers, to undertake certain actions. They do this on the basis of predefined sensible sample sentences which are determined by application developers and so-called dialog designers. This collection of sample sentences—also called "grammar"—comprises individual command words and complicated nested sentences which are appropriate at a particular point in the dialog. If the user utters such a sentence, it will be understood by the system with great certainty and the associated operating instruction will be executed.

Figure 7:
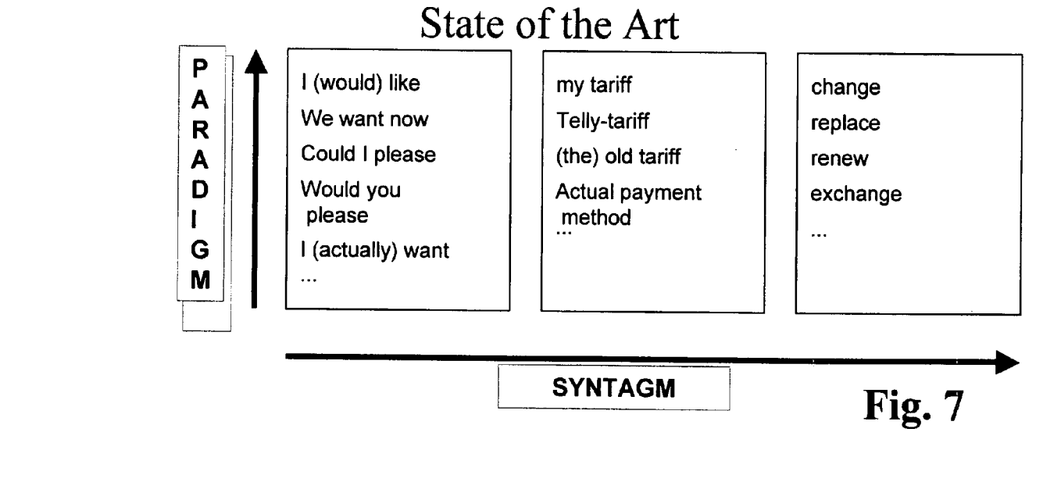
FIG. 7 shows an example of a formation of word combinations in a grammar according to the prior art.

In programming a recognition application, e.g. an NLU telephone application, the grammar is thus an indispensable building block. It is generated with the aid of a special tool, the so-called Grammar Specification Language (GSL). With it, the words to be understood and their interconnections are reproduced in advance and established for the voice recognition system. The predetermined sentences are formed from word combinations which are interchangeable (paradigmatic axis) and can be combined with one another (syntagmatic axis). An example of this is shown in FIG. 7.

The possible utterances are the result of the syntagmatic linking of the paradigmatic word combinations. To keep the spectrum of answers as large as possible, it must be accepted that sentences also become possible which are grammatically wrong such as, e.g. "Würden Sie vielleicht Telly-Tarif ersetzen?" (would you like to replace telly tariff). This so-called "overgeneration", that is to say, for example, the presentation or recognition of senseless sample sentences or expressions having the same meaning should, however, be kept low because it requires considerable system resources and, at the same time, diminishes the recognition performance because the system must compare each user utterance with a plethora of predetermined sentence combinations which are scarcely ever uttered.

In previous practice, the paradigmatic word combinations were established in a manner which links that which apparently belongs together. This assumed the meaningful quality of the words. This method, which is based on a presumed successful sentence entirely corresponds to the requirements of simple applications and leads to satisfactory results in this case. In complex applications with a large number of meaningful possible answers, in contrast, these conventional grammars become so large they load even the computing capacity of present high-performance servers up to their limit. The consequences are:

greatly increased overgeneration
perceptible delays in the recognition (latency)
dropping certainty of recognition (accuracy),
decreased system stability (robustness)

The main defect of this method consists in that the sentences specified only follow a superficial combinatorial analysis. The overgeneration generated is so large because the elements apparently belonging together actually follow other combinatorial rules which have been known for a long time in linguistics.

In summary, it is noted that the grammars currently used, which establish what sentences are recognized by an ASR system, follow traditional grammatical conventions which map natural-language utterances with inadequate structure. The bases hitherto used do not differentiate between "surface structures" and "depth structures". The linguistic hypothesis states that a syntactic depth structure and its "generative transformation" towards actual surface structures defines the capability of a language system. If, with increasing complexity, only the surface structure hitherto employed is used, it must, in order to still meet the requirements of its task, be of such large dimensions that it cannot really be reasonably maintained in operation and loads the servers up to the limits of their capacity.

The object of the invention consists in specifying a method for voice recognition based on a generative transformation/phrase structure grammar which, in comparison with conventional recognition methods, needs fewer system resources and, as a result, provides for reliable and fast recognition of language whilst at the same time reducing overgeneration.

According to the invention, this object is achieved by the features of patent claim 1.

According to the invention, a spoken phrase is analyzed for triphones contained therein, words contained in the spoken phase are formed from the recognized triphones with the aid of dictionaries and the spoken phrase is syntactically reconstructed from the recognized words using a grammar.

Advantageous embodiments and further developments of the invention are obtained from the features of the subclaims.

The contrast between the method according to the invention and the traditional Grammar Specification Language, which achieved good results with small applications even with syntactic surfaces, i.e. actual formulating of successful sentences, is particularly striking.

According to the invention, the combining rules of grammatical sentences are not reproduced on the surface but the depth structures are indicated which are followed by the syntagmatic combinations in all Indo-Germanic languages. Each sentence is described by means of a syntactic model in the form of so-called parse trees.

The GT/PS grammar is not oriented toward the potential utterings of a specific application but towards the depth structure of the syntax of Indo-Germanic languages. It provides a scaffold which can be filled with various words and maps a reality of the spoken language better than the "mimetic" method hitherto practiced.

Within the depth structures described by the parse trees, it can be seen that certain phrases are repeated within a sentence. Such repetitions can be reproduced and captured with the aid of the GSL. This not only decreases the extent of a grammar considerably but also diminishes the overgeneration of grammatically incorrect sentences.

Whereas in traditional GSL grammar, e.g. about 500 subgrammars are intertwined with one another in seven hierarchical planes, the number of subgrammars can be reduced to, e.g., 30 subgrammars in only two hierarchical planes in the GT/PS model.

The new type of grammar maps natural-language utterances in structure form and, at the same time, only has about 25% of the size of the previous grammar. Due to its small size, this grammar is more easily maintained and the compiling times decrease rapidly. Due to its small size, the accuracy is increased and the latency is decreased. The current computer capacities are utilized better and the performance of the servers is increased. In addition, the new grammar is not related to a particular application but can be used for different applications in its basic structures, as a result of which the homogeneity of the systems is enhanced and the development times are reduced.

The universal code of the depth structure makes it possible to use and create values for multilingual language systems in a dimension hitherto not achieved and the standard western European languages, in particular, can be processed with comparatively little effort.

In contrast to the previous grammar for natural-language dialog applications, the novel GT/PS grammar is based on current linguistic models which map natural-language utterances in the context of surface and depth structures. The abstract structural patterns are transferred with a Grammar Specification Language (GSL) into a hierarchically nested and intermeshed set of rules, the structures of which are mapped in the two attachments.

The technical advantages of the GT/PS grammar are thus:
the GT/PS grammar is very much smaller than the previous grammar because it manages only with two levels instead of the previous up to seven subgrammar levels;
the number of sentences covered by the grammar but grammatically wrong (overgeneration) drops drastically;
it only needs about one third of the slots hitherto used;
in contrast to the present-day voice recognition system philosophy, it fills the slots in the lower grammar levels instead of the upper ones;
it makes consistent use of the instrument provided by the GSL (Grammar Specification Language) of handing slot values up into higher grammar levels;
it has a new slot called ACTION, which can only be filled with the values GET and KILL;
it operates with slots nested together which are multitasking-capable to a high degree.
it leads to an improvement in the recognition system performance
it provides for a simplified option for introducing multi-language applications
it has a seamless integration capability in nuance technology.
The economic advantages of the PSG are:
reduction in hardware costs due to better utilization of the system resources
reduction in transmission time due to more powerful recognition
saving in personnel resources due to easier maintainability
greater customer satisfaction
applicable to all world languages (English to Chinese)

In the text which follows, the invention will be explained in greater detail with reference to a simplified exemplary embodiment and referred to the drawings. From the drawings and their description, further features, advantages and possible applications of the invention will become apparent. In the drawings.

Figure 1:
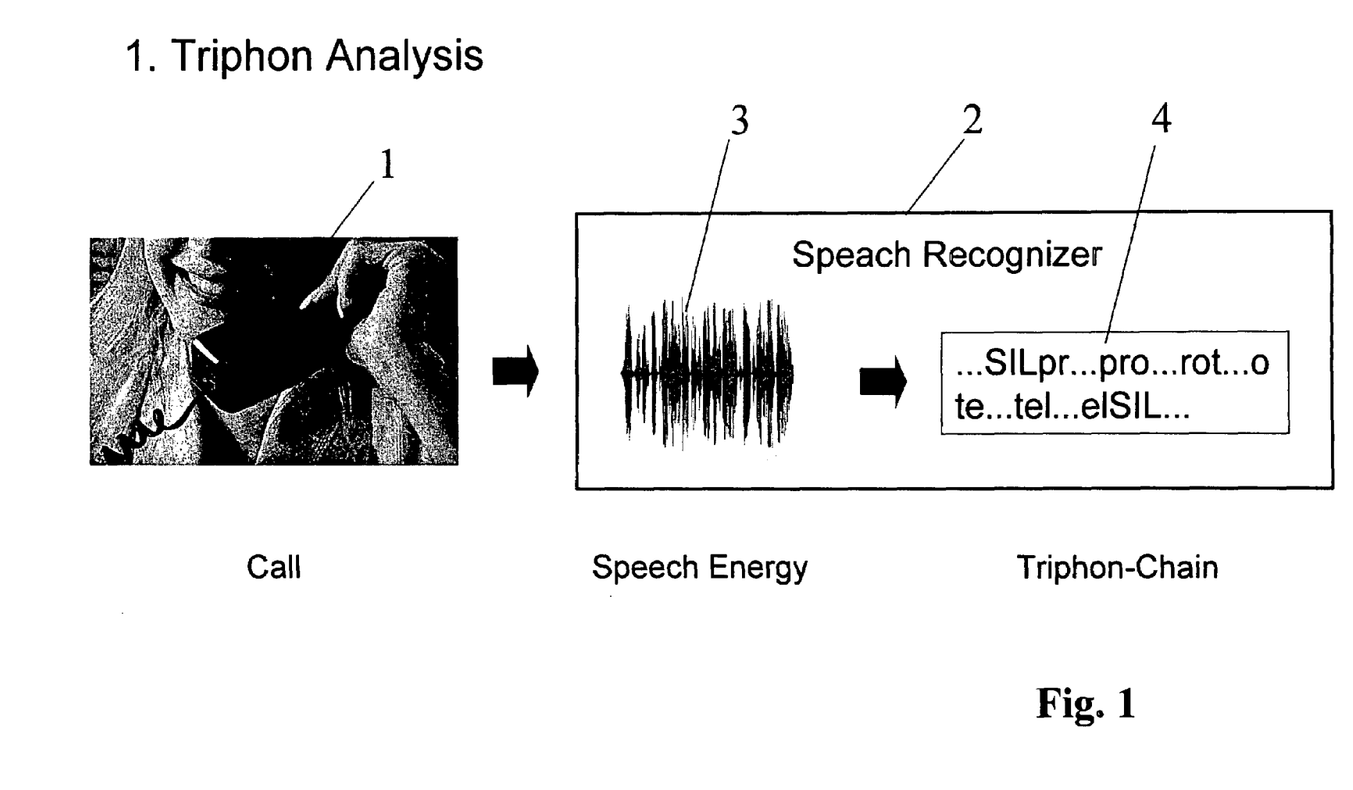
FIG. 1 shows a triphone analysis as the first step in the recognition process.

FIG. 1 shows the first step of voice recognition: the triphone analysis. The continuous flow of words of a person 1 is picked up, e.g. by a microphone of a telephone, and supplied as analog signal to a voice recognition system 2 where the analog voice signal is converted into a digital voice signal 3. The voice signal contains a multiplicity of triphones, i.e. sound segments which are matched with existing, i.e. predetermined triphone combining rules in the voice recognition system 2. The existing triphones are stored in a database which contains one or more dictionaries. The recognized triphones are then available as a triphone chain 4, e.g. "pro", "rot", "ote", "tel".

Figure 2:
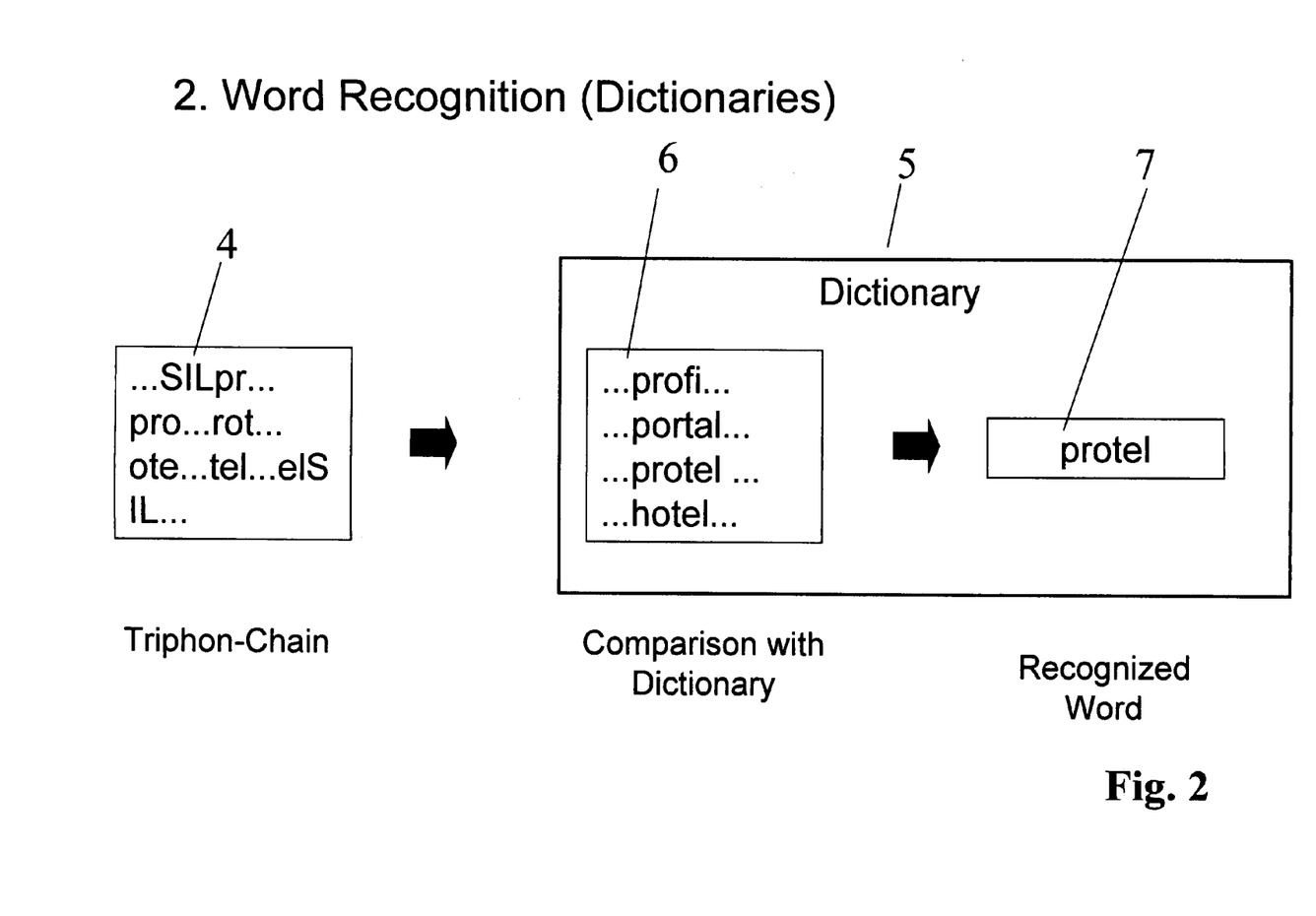
FIG. 2 shows a word recognition from the recognized triphones as the second step in the recognition process.

In a second step according to FIG. 2, meaningful words are formed from the triphones recognized. For this purpose, the existing triphone chain 4 is compared with predetermined words 6, e.g. "profi", "portal", "protel", "hotel" stored in a further dictionary 5. The dictionary 5 can comprise a particular vocabulary from colloquial language and a special vocabulary for the respective application. If the recognized triphones, e.g. "pro" and "tel" match the triphones contained in a word, e.g. "protel", the corresponding word 7 is recognized as such: "protel".

Figure 3:
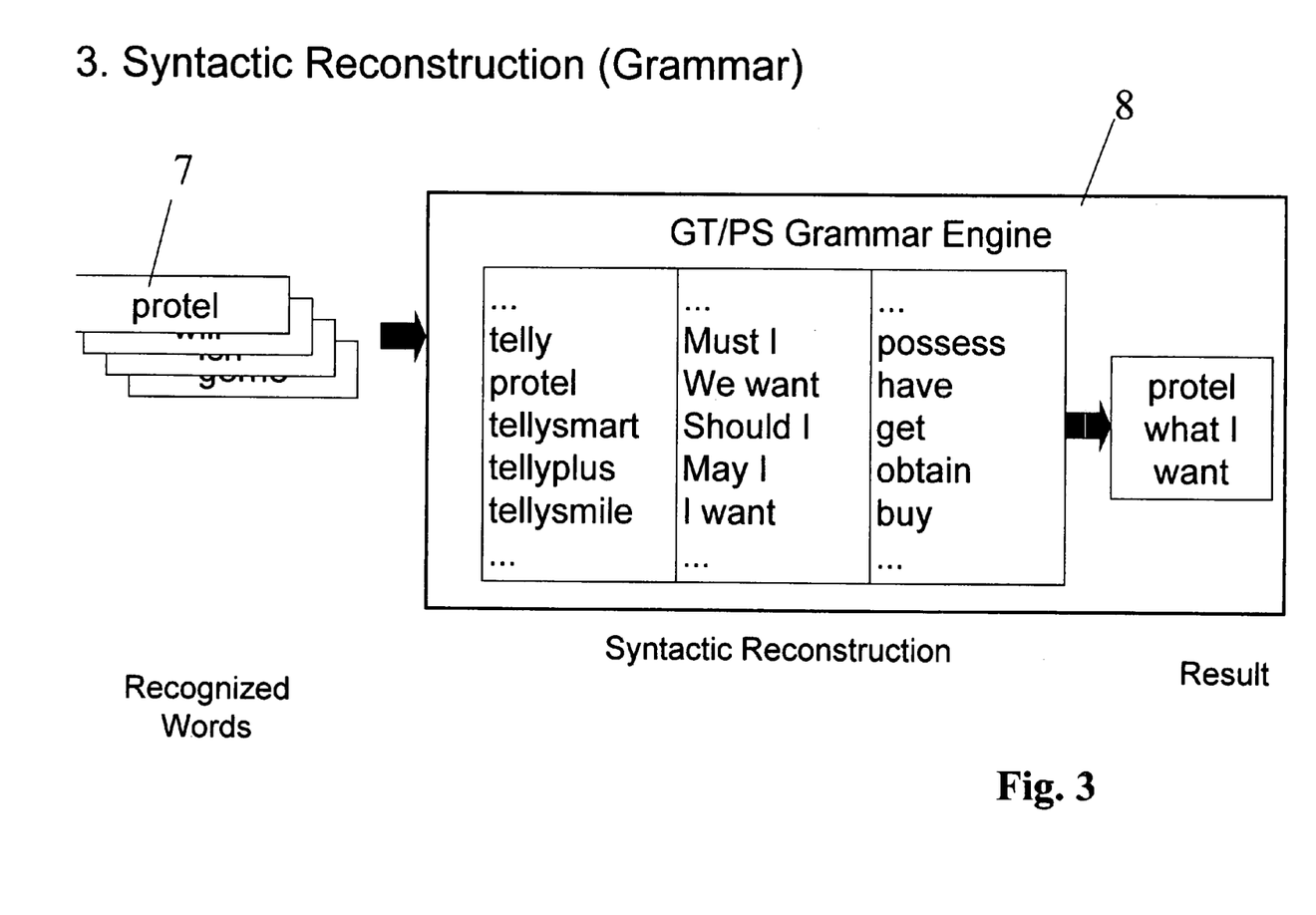
FIG. 3 shows a syntactic reconstruction of the recognized words as the third step in the recognition process.
Figure 5:
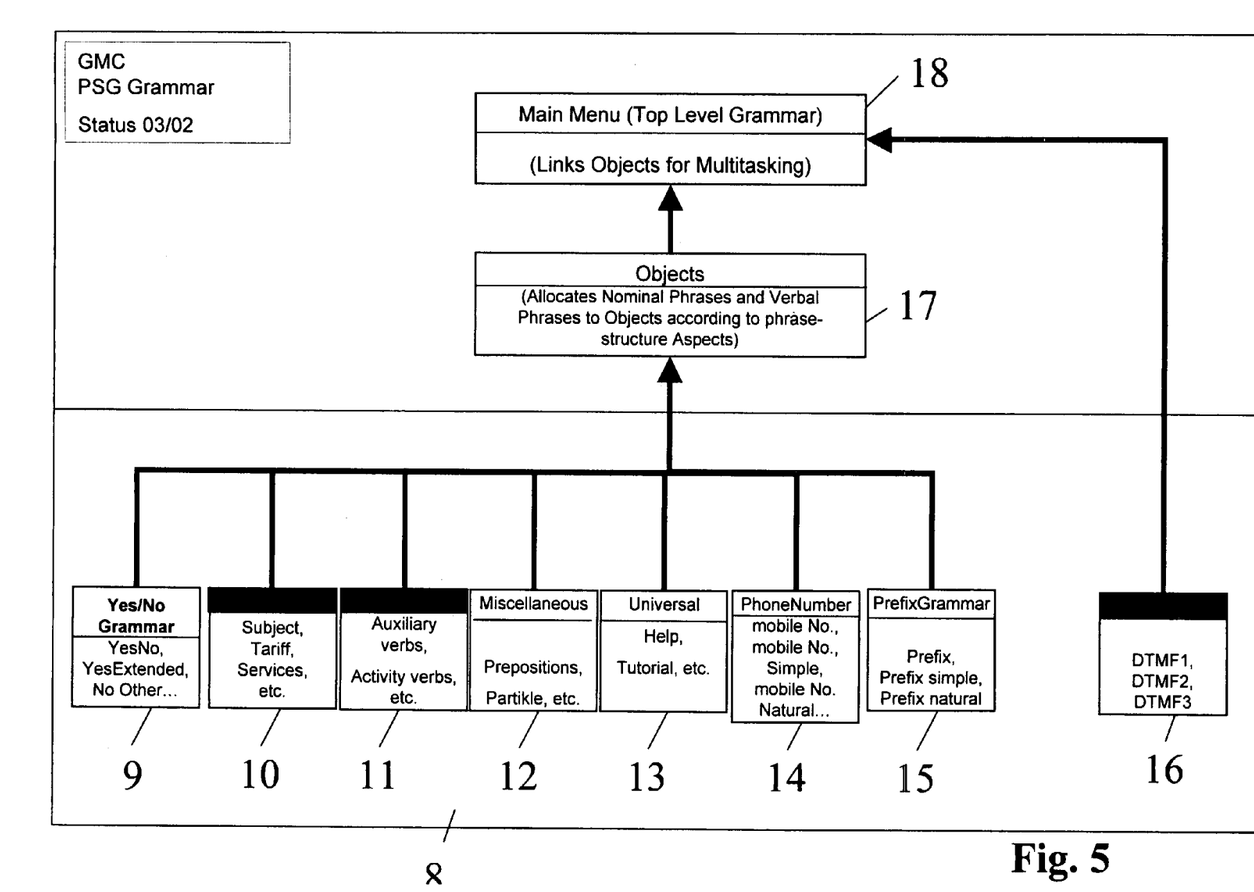
FIG. 5 shows a sample program of a possible grammar.
Figure 6:
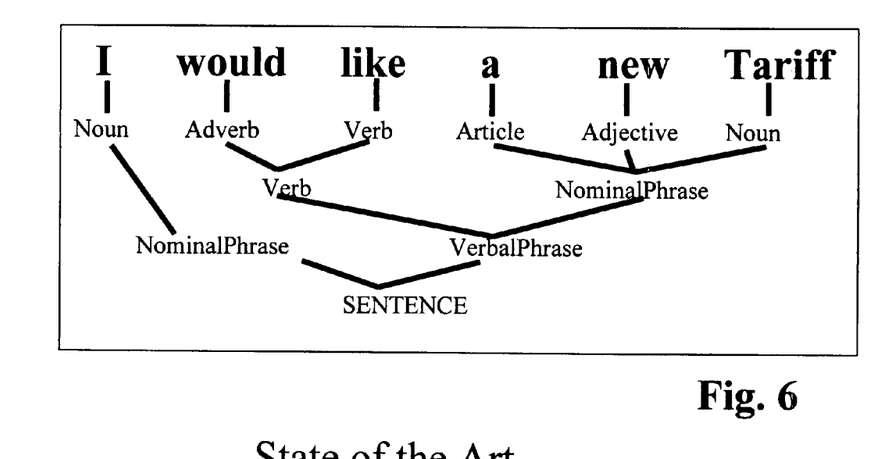
FIG. 6 shows an overview of the structure of a PSG grammar.

In the next step shown in FIG. 3, the recognized words 7 are syntactically reconstructed with the aid of the grammar 8. For this purpose, the recognized words are allocated to their word categories such as noun, verb, adverb, article, adjective, etc., as shown in FIG. 6. This is done by means of databases subdivided into part-of-speech categories. As can be seen from FIG. 5, the database 9-15 can contain both the above mentioned conventional part-of-speech categories and special part-of-speech categories such as, e.g. yes/no grammar 9, telephone numbers 14, 15. In addition, a recognition of DTMF inputs 16 can be provided.

The allocation of the part-of-speech category to the recognized words as described can already take place during the word recognition process.

In the next step (step 17), the words recognized are allocated to a verbal phrase, i.e. to a phrase based on a verb, and to a nominal phase, i.e. to a phrase based on a noun, by means of their part-of-speech categories, compare FIG. 6.

After that, the nominal phrases and the verbal phrases are combined in objects in accordance with phrase-structure aspects.

In step 18, the objects are linked with the corresponding voice-controlled application for multitasking.

Figure 4:
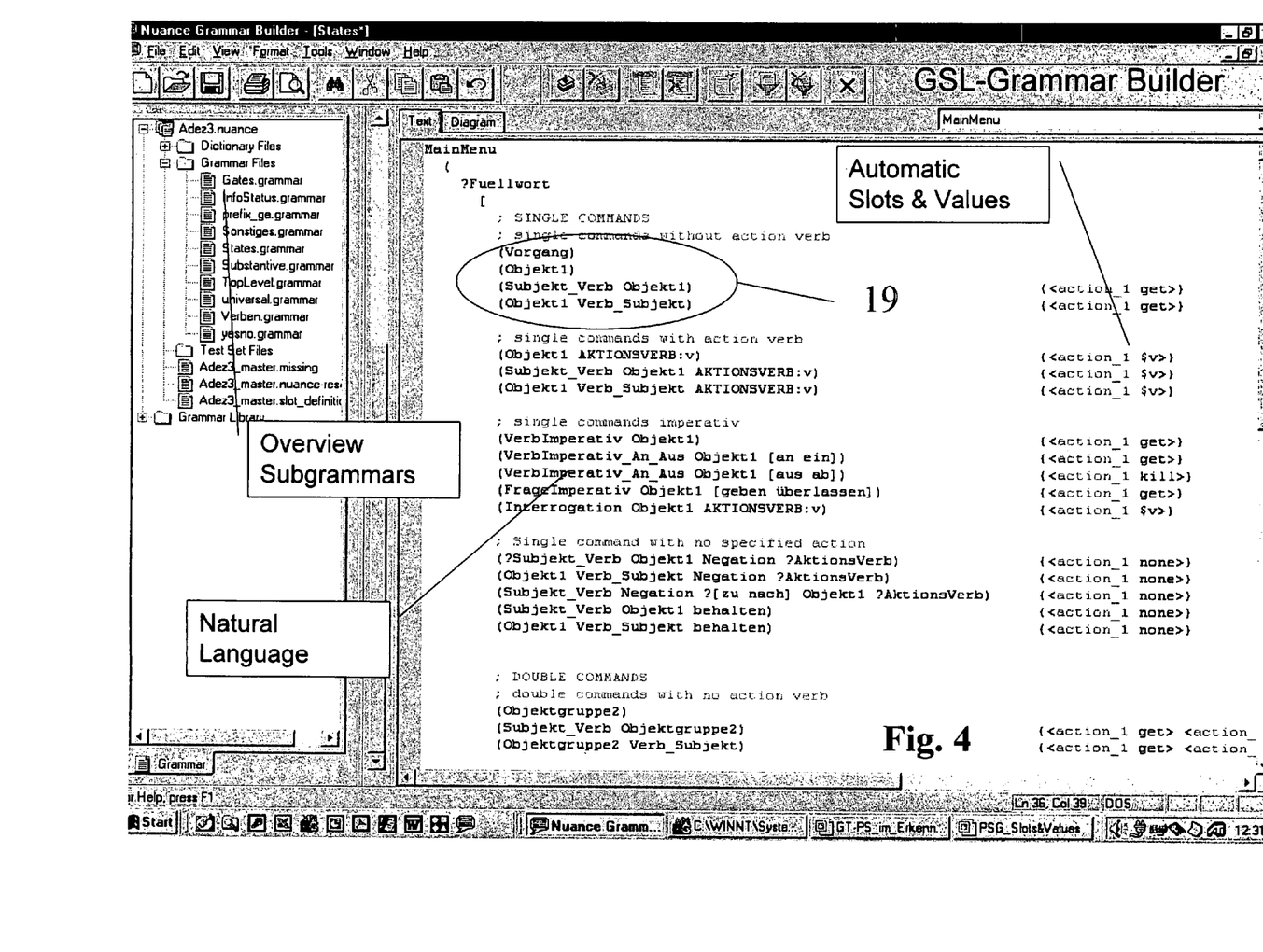
FIG. 4 shows an example of the structuring of the recognized words into categories of word types and into nominal and verbal phrases.

Each object 19 comprises a target sentence stored in the grammar 8, more precisely, a sentence model. FIG. 4 shows that such a sentence model to be defined, for example, by a word order "subject, verb, object" or "object, verb, subject". Many other sentence construction structures are stored in this general form in the grammar 8. If the part-of-speech categories of the recognized words 7 correspond to the order of one of the predetermined sentence models, they are allocated to the associated object. The sentence is considered to be recognized. In other words, each sentence model comprises a number of variables allocated to the various part-of-speech categories, which are filled with the corresponding part-of-speech categories of the recognized words 7.

The method uses the traditional Grammar Specification Language (GSL), but structures the deposited sentences in an innovative manner. In this respect, it is oriented toward the rules of the phrase structure grammar and to the concept of a generative transformation grammar.

By consistently using the depth structures of a sentence as described there, particularly the distinction between nominal phrases and verbal phrases, it is much closer to the sentence constitution of natural language than the intuitive concepts of grammar hitherto prevailing.

The GT/PS grammar is thus based on theoretical modeling which is suitable for determining the abstract principles of natural-language utterances. In the field of modern voice recognition systems, it makes it possible for the first time to virtually reverse the abstraction of syntax and to realize it as a prediction of the utterances of application users. This provides the possibility of systematic access to voice recognition grammars which were hitherto always based on the intuitive accumulation of sample sentences.

A central feature of conventional and GT/PS grammars is the hierarchical nesting in so-called subgrammars which assemble individual words like variables to a complete sentence at the highest level. The GT/PS grammar is very much smaller in this point and hierarchically much clearer than the previously known grammars. In contrast to conventional grammars, "meaningful" sentences are almost exclusively stored in the new grammar so that the degree of overgeneration, i.e. stored sentences which are wrong in the natural-language sense, drops. This, in turn, is the prerequisite for improved recognition system performance since the application only needs to choose between a few stored alternatives.

The invention claimed is:

1. A method for natural voice recognition based on a generative transformation/phrase structure grammar, comprising the following steps:

analyzing a spoken phrase for triphones contained therein;

forming words, contained in the spoken phrase, from the recognized triphones with the aid of dictionaries; and syntactically reconstructing the spoken phrase from the recognized words using a grammar, characterized in that the syntactic reconstruction of the spoken phrase comprises the following steps:

allocating the recognized words to part-of-speech categories, including verbs, nouns, etc.;

allocating the part-of-speech categories to nominal phrases and verbal phrases;

combining the nominal phrases and verbal phrases according to syntactic rules into an object having a sequence of part-of-speech categories;

comparing the sequence of the object having the sequence of part-of-speech categories with a plurality of sequences of part-of-speech categories of predetermined sentence models, and, in the case of an agreement, a sentence is considered as recognized and an action in a voice controlled application is triggered, wherein each predetermined sentence model has a number of variables allocated to part-of-speech categories, and when a sentence is considered as recognized, the variables allocated to the part-of-speech categories of the recognized sentence are filled with corresponding part-of-speech categories of the recognized words.

2. The method as claimed in claim 1, characterized in that the words to be recognized are held available subdivided into various part-of-speech categories in the dictionaries.

3. The method as claimed in claim 1, characterized in that the objects or parts thereof are linked to corresponding action parameters of a voice-controlled application.

4. The method as claimed in claim 1, wherein each predetermined sentence model is defined by a word order of the part-of-speech categories.

5. The method as claimed in claim 4, wherein the word order of the part-of-speech categories of the predetermined sentence model comprises "subject, verb, object" or "object, verb, subject."

* * * * *

UNITED STATES PATENT AND TRADEMARK OFFICE
CERTIFICATE OF CORRECTION

| | | |
|---|---|---|
| PATENT NO. | : 7,548,857 B2 | |
| APPLICATION NO. | : 10/519653 | |
| DATED | : June 16, 2009 | |
| INVENTOR(S) | : Klaus Dieter Liedtke | |

It is certified that error appears in the above-identified patent and that said Letters Patent is hereby corrected as shown below:

Title Page, Item (73) Assignee should read:

T-Mobile Deutschland GMBH (Germany)

Signed and Sealed this
Seventh Day of June, 2011

David J. Kappos
*Director of the United States Patent and Trademark Office*